United States Patent [19]

Collins

[11] Patent Number: 4,814,744
[45] Date of Patent: Mar. 21, 1989

[54] LOW TIRE-PRESSURE WARNING SYSTEM

[75] Inventor: Jerry L. Collins, Micanopy, Fla.

[73] Assignee: Collins Design Company, Inc., Micanopy, Fla.

[21] Appl. No.: 126,801

[22] Filed: Dec. 1, 1987

[51] Int. Cl.⁴ .............................................. B60C 23/00
[52] U.S. Cl. ................................ 340/443; 116/34 A; 73/146.2; 200/61.23
[58] Field of Search ............. 340/58, 52 R; 73/146.2, 73/146.4, 146.5; 116/34 R, 34 A, 34 B, 137 R, 137 A; 310/311, 321, 322, 330, 334; 200/61.22-61.24

[56] References Cited

U.S. PATENT DOCUMENTS

| 3,055,998 | 9/1962 | Collins . | |
|---|---|---|---|
| 3,413,598 | 11/1968 | Uphoff . | |
| 3,533,063 | 10/1970 | Garcia . | |
| 3,610,851 | 10/1971 | Krupski | 340/58 |
| 4,031,845 | 6/1977 | Cook . | |
| 4,067,376 | 1/1978 | Barabino . | |
| 4,131,877 | 12/1978 | Stewart et al. . | |
| 4,135,285 | 1/1979 | Weiner . | |
| 4,160,234 | 7/1979 | Karbo et al. | 340/58 |
| 4,173,011 | 10/1979 | Gibson . | |
| 4,186,377 | 1/1980 | Barabino . | |
| 4,265,579 | 5/1981 | Naruns et al. . | |
| 4,476,455 | 10/1984 | Kawakami | 340/58 |
| 4,510,484 | 4/1985 | Snyder | 340/58 |
| 4,531,112 | 7/1985 | Thomas | 340/58 |

Primary Examiner—Donnie L. Crosland
Attorney, Agent, or Firm—David R. Saliwanchik; Roman Saliwanchik

[57] ABSTRACT

A method and apparatus for detecting low air pressure in pneumatic tires on a vehicle and conveying this information to the operator of the vehicle. The invention utilizes a resonating device which creates subsonic, sonic, or ultrasonic air waves when it comes in contact with the rotating sidewall of a tire having undesirably low air pressure. The apparatus provides immediate, dependable warning of potentially dangerous low pressure conditions in tires. Furthermore, the apparatus can be used to detect low air pressure in either of dual mounted tires.

10 Claims, 6 Drawing Sheets

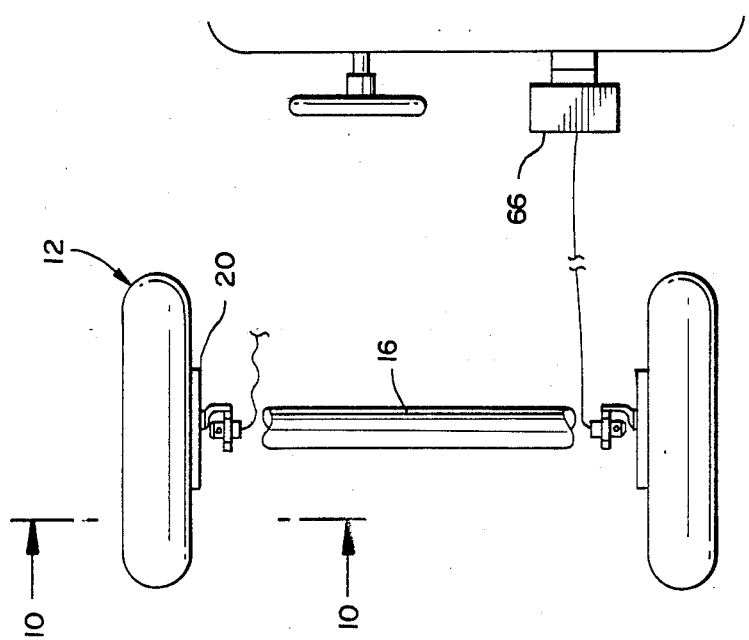
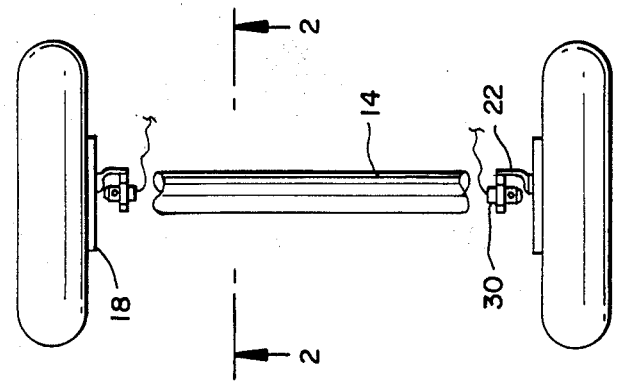
FIG. 1

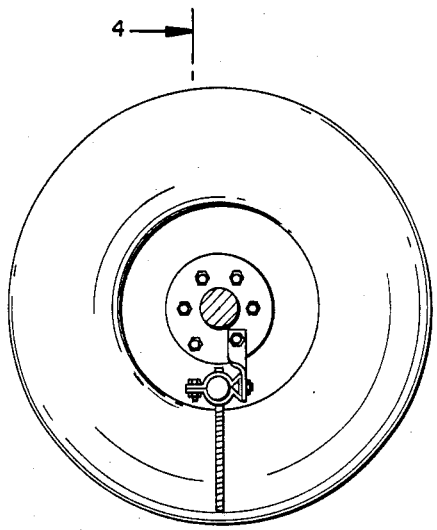 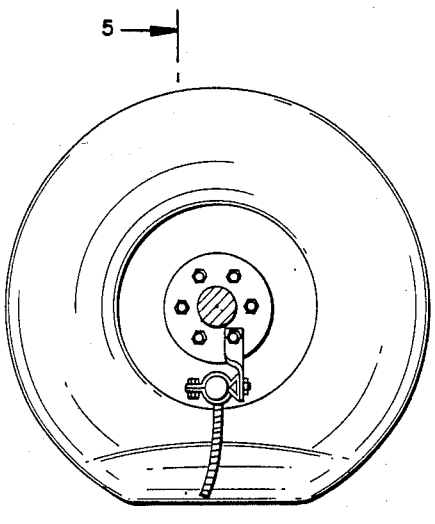
FIG. 2   FIG. 3
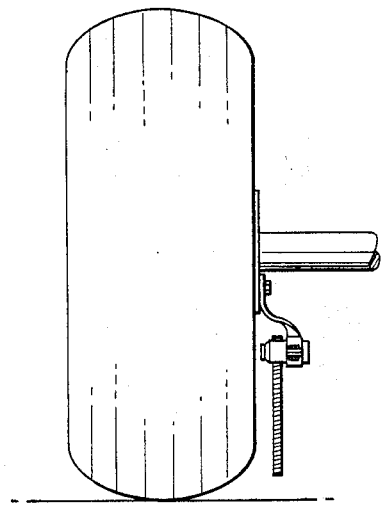 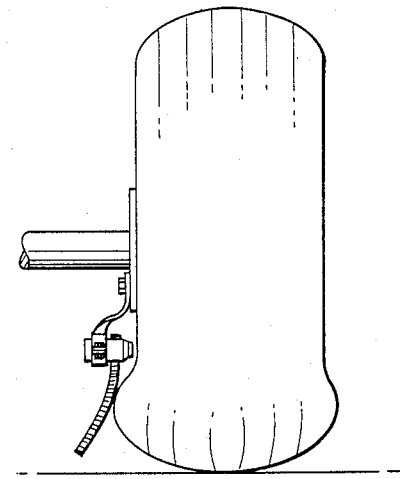
FIG. 4   FIG. 5

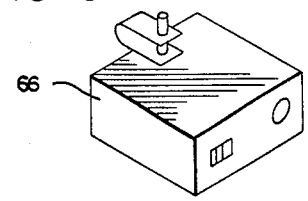
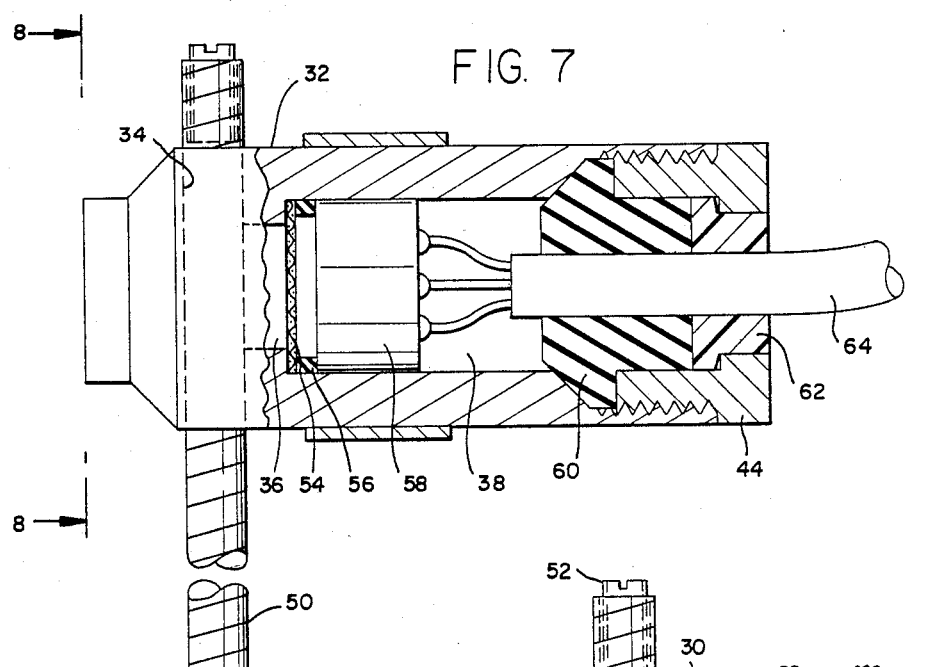
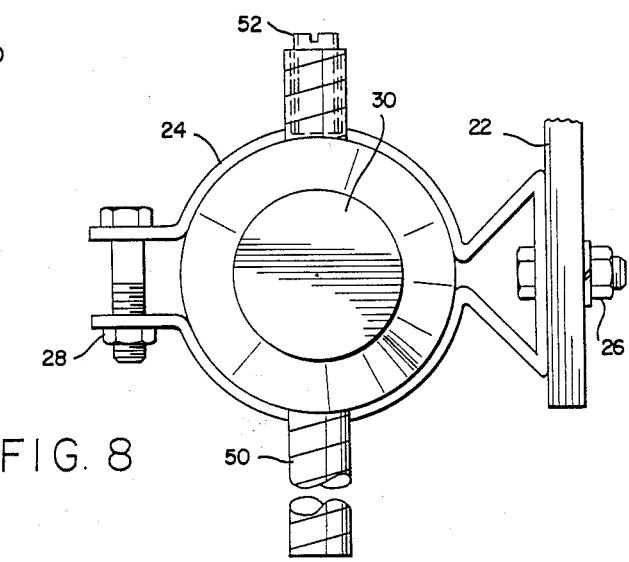

LOW TIRE-PRESSURE WARNING SYSTEM

BACKGROUND OF THE INVENTION

The present invention relates to a device and a method for warning motorists that the air pressure in one or more of their tire is low.

Most automobiles, trucks, trailers, and recreational vehicles use air-inflated (pneumatic) tires. Safe operation of these vehicles depends upon the maintenance of proper tire pressure in the tires. Frequently, tires lose pressure as the result of air seepage from around the valve stem or from punctures. This loss of air and the accompanying decrease in tire pressure can adversely effect the performance of the vehicle and presents a safety hazard.

Low air pressure in the tires leads directly to increased and abnormal temperature and wear of the tires. This wear and heat may result in a blowout of the underinflated tire. Blowouts present a serious hazard to the driver, passengers, and fellow motorists and cost the driver time and money. Blowouts are particularly dangerous on trucks, trailers, and recreational vehicles because these vehicles are generally less table and harder to handle than automobiles. Therefore, an early warning system for potential tire failure is especially valuable for the operators of these vehicles.

The need for warning of an imminent blowout has led others to create devices which attempt to detect low pressure in tires. None of these devices has proved to be commercially practical, however. The existing methods for warning motorists of low tire pressure are predominantly valve stem connected and activated by a spring biased valve that protrudes from the valve stem when low pressure occurs within the tire U.S. pat. Nos. 3,533,063; 4,031,845; 4,067,376; 4,131,877; 4,135,285; 4,186,377; and 4,165,579). Other devices are activated if a feeler arm comes in contact with the ground when the tire pressure is very low (U.S. Pats. Nos. 3,413,598; 4,173,011; and 3,055,998).

Once the currently available devices are activated, there are a variety of methods for notifying the driver of the decreased pressure. Among these methods are radio transmitters (U.S. Pat. No. 3,533,063) and whistling sounds (U.S. Pat. No. 4,135,285). The existing devices have a variety of drawbacks including expense, undependability, lack of sensitivity, and not being activated when one tire of dual mounted tires has low air pressure.

BRIEF SUMMARY OF THE INVENTION

Claimed here are a method and a device for detecting low air pressure in tires and conveying this information directly and immediately to the driver of the vehicle.

One embodiment of the claimed invention is a resonating device which extends parallel to the sidewall of each tire. When the air pressure in a tire decreases, the side wall bulges slightly, and the bulge comes in contact with the resonating device. When the rotating tire first comes in contact with the resonating device, air waves are created within the resonator. These air waves may be subsonic, sonic, or ultrasonic.

The resonating device is attached to a microphone and an amplifying system which converts the sound to either a visual or audio alarm. Thus the driver is warned that air pressure in one of the tires is low.

The present invention has the advantage of giving reliable direct notification to the driver of low air pressure. The current device has the further advantage of being simple, without electrical switches or moving parts, so it is more dependable. It is also designed so that if damage results from a blowout, road debris, snow, or ice, one component of the invention may easily and inexpensively be either repaired or replace.d Furthermore, the present invention is sensitive in order to give early warning of low pressure, thereby minimizing wear to the tire. One additional advantage of the claimed invention is that it does not give false signals even when operating at high speeds.

The present invention has the further advantage of being able to detect low pressure in either of dual mounted tires. Therefore, it can not only be used on cars, it can be used on trucks, recreational vehicles, horse trailers, utility trailers, conversion vans, and motor homes.

BRIEF DESCRIPTION OF THE DRAWINGS

FIG. 1 is a fragmentary plan view of a portion of a conventional vehicle, looking through the axles. This figure illustrates how the low tire pressure indicators are mounted adjacent to tires in order to facilitate detecting a low pressure condition.

FIG. 2 is an enlarged vertical sectional view taken along plane 2—2 of FIG. 1. This figure illustrates how the indicator device may be mounted on an axle flange (or hub) proximate to a tire.

FIG. 3 is a vertical sectional view similar to FIG. 2 showing how the indicator device is actuated when a low pressure condition of the tire exists.

FIG. 4 is a distal view of FIG. 2.

FIG. 5 is a distal view of FIG. 3.

FIG. 6 is a perspective view of the amplifier and signal assembly which may be mounted on the vehicle dashboard and which contains or is adapted to be connected to an indicator for signalling a low pressure tire condition.

FIG. 7 is an enlarged vertical sectional view taken through one of the indicator devices.

FIG. 8 is an enlarged sectional view taken substantially along the plane 8—8 in FIG. 5.

DETAILED DESCRIPTION OF THE INVENTION

Figure 9:
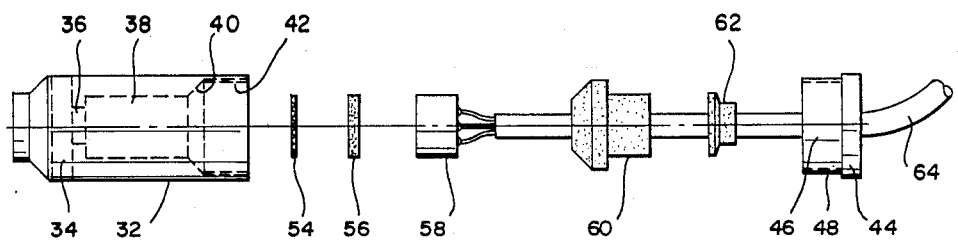
FIG. 9 is an exploded view of FIG. 7.
Figure 10:
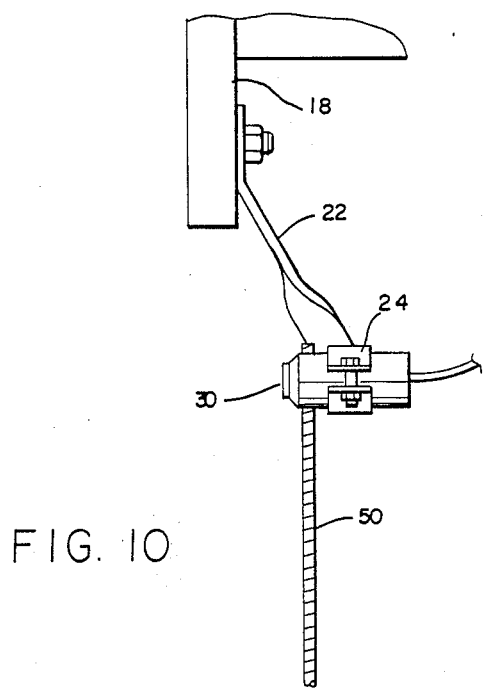
FIG. 10 shows the mounting hardware and how the device may be attached to an axle flange.

Each low tire pressure indicator system includes a resonating device, a housing containing a microphone, a sound amplifying and transmitting system, an audio or visual alarm, as well as means for attaching the various components to the appropriate locations on the vehicle.

Low pressure in a tire is initially detected when the rotating sidewall of the tire strikes a resonating device 50 which extends parallel to the tire (FIGS. 3 and 5). Under normal operating conditions when the tire is properly inflated with adequate air pressure, the resonator 50 may be located from about ⅛ inch to about 2 inches away from the sidewall of the tire (FIGS. 2 and 4). For example, the resonating device 50 may be approximately ¼ inch from the sidewall of the tire.

As a tire loses pressure, the sidewall will begin to become more convex, bulging outward towards the said resonating device. When the pressure is undesirably low, the sidewall of the tire will extend outward sufficiently to come in contact with the resonating device 50 (FIGS. 3 and 5).

Once contact is made between the rotating sidewall of the tire and the resonating device 50, air waves are created by the percussion of the tire against said resonating device. Unlike feeler rods which need to be bent in order to be activated, the resonating device is extremely sensitive so that it is activated when the tire simply makes contact with said resonating device. This sensitivity results from the unique use of air waves which are produced in the resonating tube when the tire makes contact with said resonating device. The use of the air waves to trigger the alarm system has the further advantage of eliminating false signals which could result when the device is inadvertently struck by small road debris.

Said resonating device 50 is cylindrical and can be a spiral coil of metal, similar in structure to a feeler rod. When struck by a tire sidewall, the cylindrical resonating device produces resonating air waves. The material used to make the resonating device may be any material which is capable of transforming the percussion of the tire against the device into subsonic, sonic, or ultrasonic air waves. Typically, said resonating device will be made out of copper, beryllium, nickel, chrome, steel, or stainless steel.

The cylindrical resonating tube 50 may be from about 3 inches long to about 2 feet long, depending upon the size of the tire. For example, said resonating tube can be approximately 8 inches long. The cross-sectional diameter of said resonating device may be from about 1/16 inch to about ½ inch and can be, for example, about 7/32 inch.

The cylindrical resonating tube 50 is connected to a housing 32. Said housing and attached resonating device 50 are connected to any surface of the vehicle which allows the said resonating device to extend parallel to the road-containing area of the tire. For example, the housing 32 can be attached to the axle flange 18. In the case of dual mounted tires, the resonating device may be located so that it is parallel to either of the two tires. If either of the two tires begins to lose pressure, the other tire will bear an increased load. The increased load on the non-defective tire will cause that tire to increase in convexity just as if its pressure were low. Therefore, a decrease in the pressure of either tire will cause increased convexity of both tires. Consequently, regardless of which dual mounted tire the resonator is mounted next to, it will be able to detect a loss of pressure in either tire.

The indicator device 30 is mounted to the axle flange 18 by means of bracket 22 and pipe clamp 24. The indicator device 30 is secured to the pipe clamp 24 by a bolt 28 and the pipe clamp 24 secured to the mounting bracket 22 by a bolt 26 and the resonator 50 secured by a resonator set screw 52.

The resonating tube 40 may be detachable form the housing 32 to facilitate repair or replacement. Using this arrangement,s aid resonating device should be the only component of the claimed invention which will need servicing when used under normal conditions. if said resonating device should be damaged, it can be bent back into place by hand or it may be easily removed and replaced with an inexpensive replacement resonating tube.

Each housings 32 has a hole 34 for inserting the resonator 50. A second hole is bored roughly perpendicularly into the resonator hole 34 to create an echo chamber 36 which allows the sonic, subsonic, and ultrasonic air waves created by the resonator 50 to be transmitted to a device which is capable of receiving sound waves and converting them to an electrical current. Typically, this will be a microphone 58. A larger hole 38 is bored for housing the microphone 58 in a horizontal plane. Also, the microphone 58 is protected from water by a screen mesh 54 and a rubber "o" ring 56.

The microphone 58 is attached to a power and signal cable 64, which is connected to the amplifier-alarm 66 that is mounted on the dash. The power and signal cable 64 is shielded form water by a waterproof rubber seal 60 and against electrical shorting by a plastic bushing 62. The rubber seal 60 and plastic bushing 62 are inserted in the hole in the housing end cap 44 and the end cap threads 48 are screwed into the housing threads 42, which causes compression of the rubber seal 60 to press against the taper 40 created inside the housing, making it water proof, as shown in the exploded view of FIG. 9.

I claim:

1. An apparatus for alerting the driver of a vehicle that the air pressure in a pneumatic tire has become low; said apparatus comprising,
   (a) a resonating device capable of transforming a percussion of a rotating tire against it into subsonic, sonic, or ultrasonic air waves,
   (b) a housing into which said resonating device is inserted and containing an echo chamber which transfers the air waves created by said resonating device to
   (c) a microphone, also contained within said housing, which converts the air waves into an electric current,
   (d) a system for transmitting the electrical current, and
   (e) a consonant amplifier which converts the microphone current into an audible or visual alarm which can be heard or seen by the driver.

2. An apparatus according to claim 1 where said resonating device is a cylindrical spiral coil of metal which produces resonating air waves when struck by the sidewall of a tire, said cylinder being from about 3 inches to about 2 feet in length.

3. An apparatus according to claim 2 where said resonating device is made from metal comprised of copper, or beryllium, or nickel, or chromium, or steel, or stainless steel, or any combination of these metals.

4. A method of detecting low air pressure in either of two dual mounted pneumatic tires whereby the apparatus of claim 1 is installed in such a way that the resonating device is extended parallel to either of said dual mounted tires.

5. A method according to claim 4 wherein said resonating device is extended parallel to either of said dual mounted tires in such proximity to the sidewall of either of said dual mounted tires so that said resonating device will come in contact with said sidewall if either of the two following circumstances arises:
   (a) low air pressure in the interior of the tire next to which said resonating device is mounted causes the sidewall of sid tire to become more convex, or
   (b) low air pressure in the interior of the tire which is not next to the resonating device causes added load to be applied to the tire which is next to said resonating device, said added load causing increased convexity in the sidewall of the tire next to said resonating device.

6. A method according to claim 4 to be used for detecting low pressure in tires on cars, trucks, recreational vehicles, horse trailers, utility trailers, conversion vans, motor homes, or any other vehicle using dual mounted pneumatic tires.

7. A method for detecting low air pressure in a rotating pneumatic tire which comprises extending a resonating device parallel to the sidewall of said tire in such proximity so that an increase convexity of said sidewall due to a decrease in air pressure in the interior of said tire will cause said sidewall to come in contact with said resonator; the percussion of said sidewall with said resonating device causing air waves which travel to an echo chamber attached to one end of said resonating device; said air waves are converted to electrical current by a microphone located adjacent to said echo chamber; said electrical current is converted to an audio or visual alarm by means of a consonant amplifier.

8. A method according to claim 7 where said resonating device is a cylindrical spiral coil of metal said cylinder being from about 3 inches to about 2 feet in length.

9. A method according to claim 7 where said resonating device is made from metal comprised of copper, or beryllium, or nickel, or chromium, or steel, or stainless steel, or any combination of these metals.

10. A method according to claim 7 to be used for detecting low pressure in tires on cars, trucks, recreational vehicles, horse trailers, utility trailers, conversion vans, motor homes, or any other vehicle using pneumatic tires.

* * * * *

UNITED STATES PATENT AND TRADEMARK OFFICE
CERTIFICATE OF CORRECTION

PATENT NO. : 4,814,744

DATED : March 21, 1989

INVENTOR(S) : Jerry L. Collins

It is certified that error appears in the above–identified patent and that said Letters Patent is hereby corrected as shown below:

Column 1:   line 7: "tire" should read --tires--; line 55: "embodiment" should read --element--.
Column 3:   line 57: "40" should read --50--.
Column 4:   line 12: "form" should read --from--.

Signed and Sealed this

Twenty-eighth Day of November 1989

*Attest:*

JEFFREY M. SAMUELS

*Attesting Officer*     *Acting Commissioner of Patents and Trademarks*